United States Patent [19]
Munson et al.

[11] Patent Number: 5,568,928
[45] Date of Patent: Oct. 29, 1996

[54] VIDEO GAME CONTROLLER FOR USE WITH AN EXERCISE APPARATUS

[75] Inventors: Bruce N. Munson, Muncie; Steven C. Visser, West Lafayette, both of Ind.

[73] Assignee: Exertron, Inc., Muncie, Ind.

[21] Appl. No.: 382,135

[22] Filed: Feb. 1, 1995

[51] Int. Cl.$^6$ ............................. A63F 9/22; G06F 17/00
[52] U.S. Cl. .................... 463/37; 463/36; 482/1
[58] Field of Search ................... 273/433–434, 273/438, 148 B, 85 G, DIG. 28, 440, 445; 364/410

[56] References Cited

U.S. PATENT DOCUMENTS

| | | | |
|---|---|---|---|
| Re. 34,728 | 9/1994 | Hall-Tipping | 364/410 |
| 3,518,985 | 7/1970 | Quinton . | |
| 4,278,095 | 7/1981 | Lapeyre . | |
| 4,358,118 | 11/1982 | Plapp | 273/85 G |
| 4,408,613 | 10/1983 | Relyea . | |
| 4,512,566 | 4/1985 | Bicocchi . | |
| 4,512,567 | 4/1985 | Phillips | 273/DIG. 28 |
| 4,542,897 | 9/1985 | Melton et al. | 273/DIG. 28 |
| 4,630,817 | 12/1986 | Buckley | 273/148 B |
| 4,637,605 | 1/1987 | Ritchie | 273/148 B |
| 4,709,917 | 12/1987 | Yang | 273/DIG. 28 |
| 4,711,447 | 12/1987 | Mansfield | 273/DIG. 28 |
| 4,735,410 | 4/1988 | Nobuta . | |
| 4,790,528 | 12/1988 | Nakao et al. . | |
| 4,909,514 | 3/1990 | Tano | 273/148 B |
| 4,925,189 | 5/1990 | Braeunig | 273/148 B |
| 4,976,435 | 12/1990 | Shatford et al. | 273/DIG. 28 |
| 5,139,261 | 8/1992 | Openiano | 273/438 |
| 5,142,358 | 8/1992 | Jason | 364/413.04 |
| 5,149,084 | 9/1992 | Dalebout et al. | 273/440 |
| 5,195,746 | 3/1993 | Boyd et al. | 273/148 B |
| 5,209,662 | 5/1993 | Fujita et al. | 273/85 G |
| 5,229,756 | 7/1993 | Kosugi et al. | 273/438 |
| 5,240,417 | 8/1993 | Smithson et al. | 273/434 |
| 5,308,296 | 5/1994 | Eckstein | 273/438 |
| 5,362,069 | 11/1994 | Hall-Tipping | 273/148 B |
| 5,364,271 | 11/1994 | Aknin et al. | 273/438 |

FOREIGN PATENT DOCUMENTS

1183180  2/1985  Canada ..................... 273/84

Primary Examiner—Jessica J. Harrison
Assistant Examiner—Mark A. Sager
Attorney, Agent, or Firm—Woodard, Emhardt, Naughton, Moriarty & Mcnett

[57] ABSTRACT

A video game controller for use with an exercise apparatus. The controller includes a gross motion sensor which is activated by the palm of the user's hand when the user's wrist is rotated. In this way, a "steering" input can be sensed by the controller and forwarded to the video game. The controller further includes a pair of "action" switches which may be conveniently activated by the user's fingers. The controller may be formed as an integral part of the exercise apparatus handle or as a separate member designed for convenient attachment to the handle in a retrofit application.

15 Claims, 11 Drawing Sheets

VIDEO GAME CONTROLLER FOR USE WITH AN EXERCISE APPARATUS

TECHNICAL FIELD OF THE INVENTION

The present invention relates generally to video game controllers for exercise equipment, and more particularly to a video game controller for an exercise apparatus that can be used with many different exercise equipment designs, or can be used as a retrofit controller for existing exercise equipment.

BACKGROUND OF THE INVENTION

With increasing scientific awareness of the positive correlation between aerobic exercise and overall general health (over and above mere physical conditioning), there has been a corresponding increase in the public's awareness of these benefits and a desire to integrate such exercise into their daily routine. Because the average working person enjoys most of his or her leisure time in the evening hours, this is consequently the most convenient time for most people to exercise. There exists, however, general safety concerns about exercising out of doors after dark, and also about exercising in inclement weather. In response to these concerns, several types of indoor exercise devices have been developed, such as stationary bicycles, stair machines and treadmills. Consumer demand for such devices continues to be very strong, as new people continue to make the commitment to incorporate exercise into their lifestyles.

The reality of such an indoor exercise routine, however, frequently falls far short of most people's expectations. In the attempt to remove the negative elements of outdoor exercise, most of the positive elements have been removed as well. Consequently, without the stimulus of varying scenery, a sense of motion and a need to concentrate on one's surroundings in order to avoid obstacles, most people find continued indoor exercise to be laborious, unfulfilling, tedious and unbearably dull. Because there is nothing "to do" while using such stationary exercise equipment, most people begin to use them less and less frequently, until they become just another place to hang clothes to dry alter washing.

In order to counteract this effect, there have been many attempts in the prior art to provide external stimuli to the user of such stationary exercise equipment. The most successful of these attempts involves coupling the controls of a video game to the exercise equipment so that the user may play the video game while exercising. This has been found to provide the missing external stimuli that are necessary to prevent the exercise routine from becoming monotonous and boring.

Unfortunately, most such prior art video game controllers are designed for one particular piece of exercise equipment and incorporate sensors to detect when particular pieces of the equipment, such as the handlebars of a stationary nt controller for each piece of equipment, such as a bicycle, stair machine or treadmill. Not only does this increase the cost of designing and producing such controllers because they are built in lower volume, but the consumer is required to pay for a video game controller for each piece of exercise equipment he buys. Furthermore, because such controllers operate by sensing the movement of some piece of the exercise equipment, it is not possible to use any of them as a universal controller which can be retrofit to a large number of exercise devices manufactured by various companies.

There is therefore a need for a device which provides a controller between a piece of exercise equipment and a video game, such that the controller may be used with many different exercise equipment designs or be used as a retrofit controller for existing exercise equipment. Additionally, there is a need for a controller that is ergonomically designed so that the use of the controller is intuitive to the user. The present invention is directed toward meeting these needs.

SUMMARY OF THE INVENTION

The present invention relates to a video game controller for use with an exercise apparatus. The controller includes a gross motion sensor which is activated by the palm of the user's hand when the user's wrist is rotated. In this way, a "steering" input can be sensed by the controller and forwarded to the video game. The controller further includes a pair of "action" switches which may be conveniently activated by the user's fingers. The controller may be formed as an integral part of the exercise apparatus handle or as a separate member designed for convenient attachment to the handle in a retrofit application.

In one form of the invention a video game controller for use with an exercise apparatus is disclosed, comprising a first portion; a second portion; a connecting portion coupling the first and second portions; a gross motion sensor integrated with the first portion; and output means for coupling a signal produced by the gross motion sensor to a video game apparatus; wherein the first portion, the connecting portion, and the second portion are coupled in a substantially U-shaped configuration in order to facilitate mounting the controller over a handle of the exercise apparatus.

In another form of the invention, an exercise apparatus including a video game controller is disclosed, comprising a handle adapted to be gripped by a user's hand while performing an exercise on the exercise apparatus; a gross motion sensor coupled to the handle; and output means for coupling a signal produced by the gross motion sensor to a video game apparatus; wherein the signal produced by the gross motion sensor is indicative of pressure applied to different points on the handle in response to flexure of the user's wrist.

In another form of the invention a video game controller for use with an exercise apparatus is disclosed, comprising means for securing the controller to a handle of the exercise apparatus such that the controller may be gripped by a hand of a user of the exercise apparatus; a gross motion sensor integral with the controller; and output means for coupling a signal produced by the gross motion sensor to a video game apparatus; wherein the signal produced by the gross motion sensor is indicative of pressure applied to different points on the controller in response to flexure of the user's wrist.

Other objects and advantages of the present invention are described in the following Detailed Description.

DESCRIPTION OF THE PREFERRED EMBODIMENT

For the purposes of promoting an understanding of thee principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
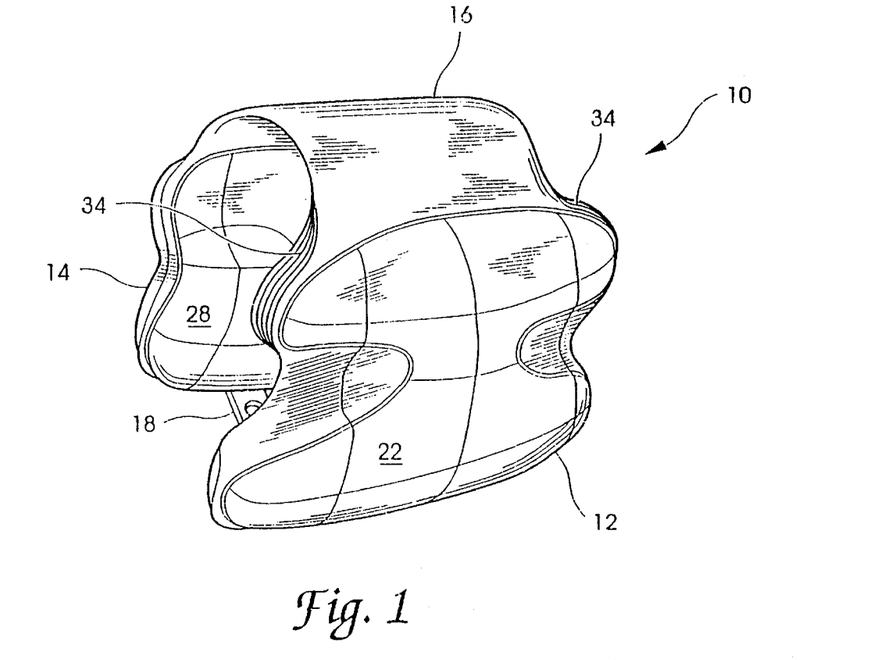
FIG. 1 is a front perspective view of a preferred embodiment of the present invention.

The present invention is directed toward a video game controller which can be used with a wide variety of exercise equipment. The controller of the present invention can be incorporated into many different types of exercise equipment during manufacture, or can be easily added on to existing exercise equipment, as will become apparent in the following discussion. Referring now to FIG. 1, a perspective view of the preferred embodiment of the present invention is illustrated, and indicated generally at 10. The controller 10 comprises two main body portions, a front portion 12 which faces the user of the exercise equipment, and a back portion 14 which faces away from the user of the exercise equipment. The controller 10 of the preferred embodiment is designed to fit over the handlebar or handrail of a piece of stationary exercise equipment, such as a stationary bicycle, a stair climbing machine, or a treadmill, for example. The front portion 12 and the back portion 14 are connected by a flexible connecting member 16, which is preferably constructed of a flexible rubber-like material, which will conform and adapt to various handlebar or handrail sizes and shapes. Alternatively, the front portion. 12, the back portion 14 and the connecting member 16 may be integrally formed or molded from, for example, a single piece. The controller 10 is installed on such a handlebar or handrail by draping the connecting means 16 over the top of the handlebar such that the front portion 12 faces the user and the rear portion 14 faces away from the user. Integral straps 18 and 20 (see FIGS. 1, 2 and 13) are formed as part of the front portion 12 and wrap around the bottom surface of the handlebar and are fastened to the bottom of the rear portion 14, thereby securing the controller 10 to the exercise equipment handle.

Figure 2:
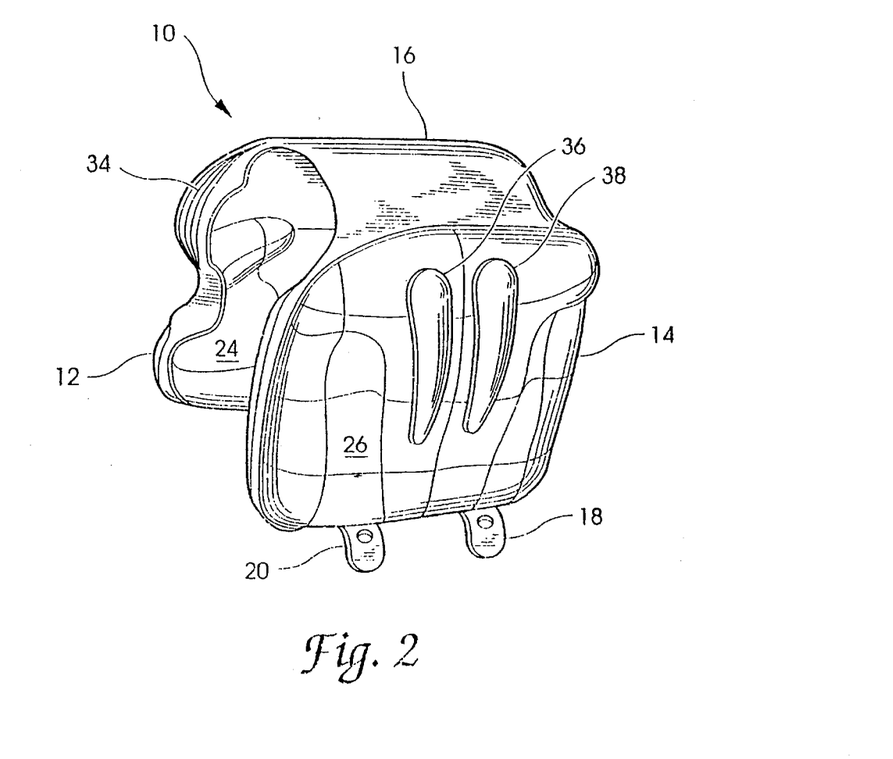
FIG. 2 is a rear perspective view of the preferred embodiment of the present invention.

Referring now to FIG. 2, the controller 10 is illustrated in perspective view looking toward the rear portion 14. The front portion 12 of the controller 10 comprises members 22 and 24 arranged in a substantially clamshell configuration. The members 22 and 24 are preferably rigid and formed by an injection molded plastic process. The flexible connecting member 16 extends between the portions 22 and 24 and is securely attached to their peripheral edges, thereby defining an enclosed space therebetween. Similarly, the rear portion 14 is formed from rigid members 26 and 28 which are arranged in a substantially clamshell configuration and coupled to one another by the flexible member 16 at their peripheral edges, thereby forming a second enclosed space therebetween.

Figure 3:
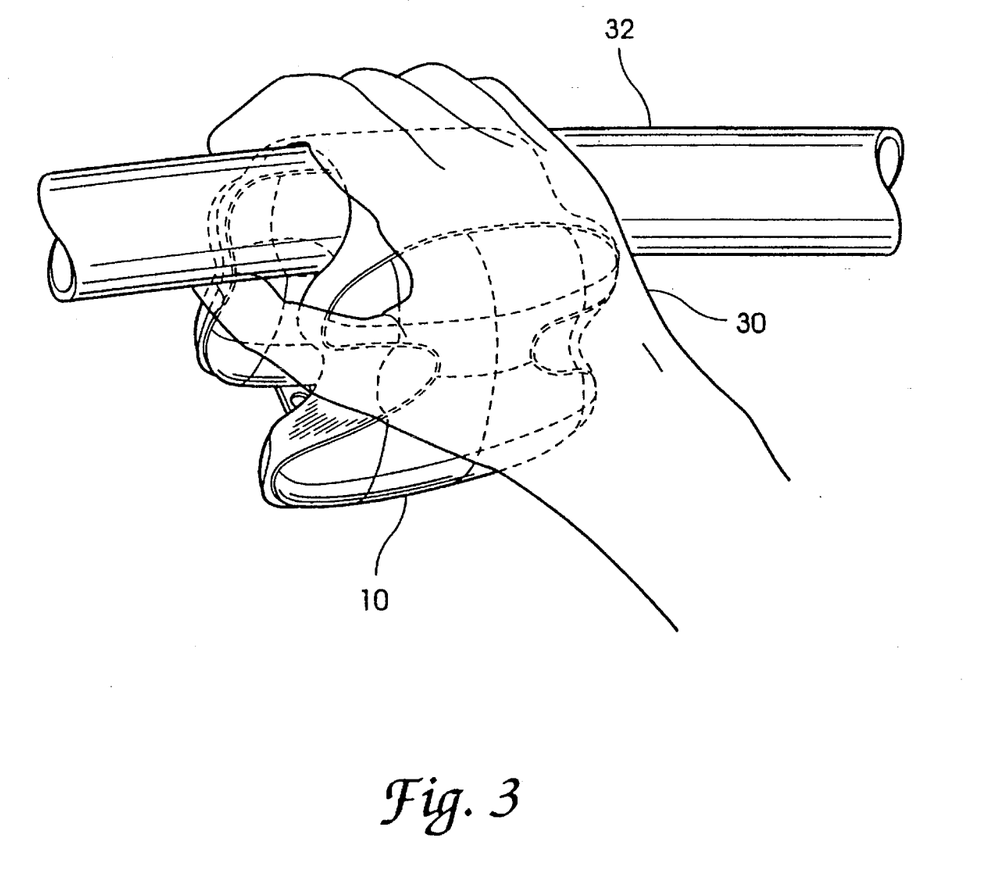
FIG. 3 is a perspective view of the preferred embodiment of the present invention mounted on an apparatus and in use by a user of the apparatus.

Because of the position of the controller 10 on the handle of the exercise equipment, one of the user's hands will be placed over the top of the controller 10 while holding onto the handle of the exercise equipment. FIG. 3 illustrates a hand 30 of a user grasping the handle 32 of the exercise equipment at the location of the controller 10. It will be appreciated that in this position, the user's palm is located against the upper portion of member 22. Referring once again to FIGS. 1 and 2, the flexible connecting member 16 includes bellows 34 in the areas where it connects the upper portion of member 22 to the upper portion of member 24. The bellows 34 allow movement of the upper portion of member 22 with respect to the upper portion of member 24. This further allows deformation of the controller 10 in this area when the user's hand 30 applies pressure to this area of the controller 10.

Figure 6:
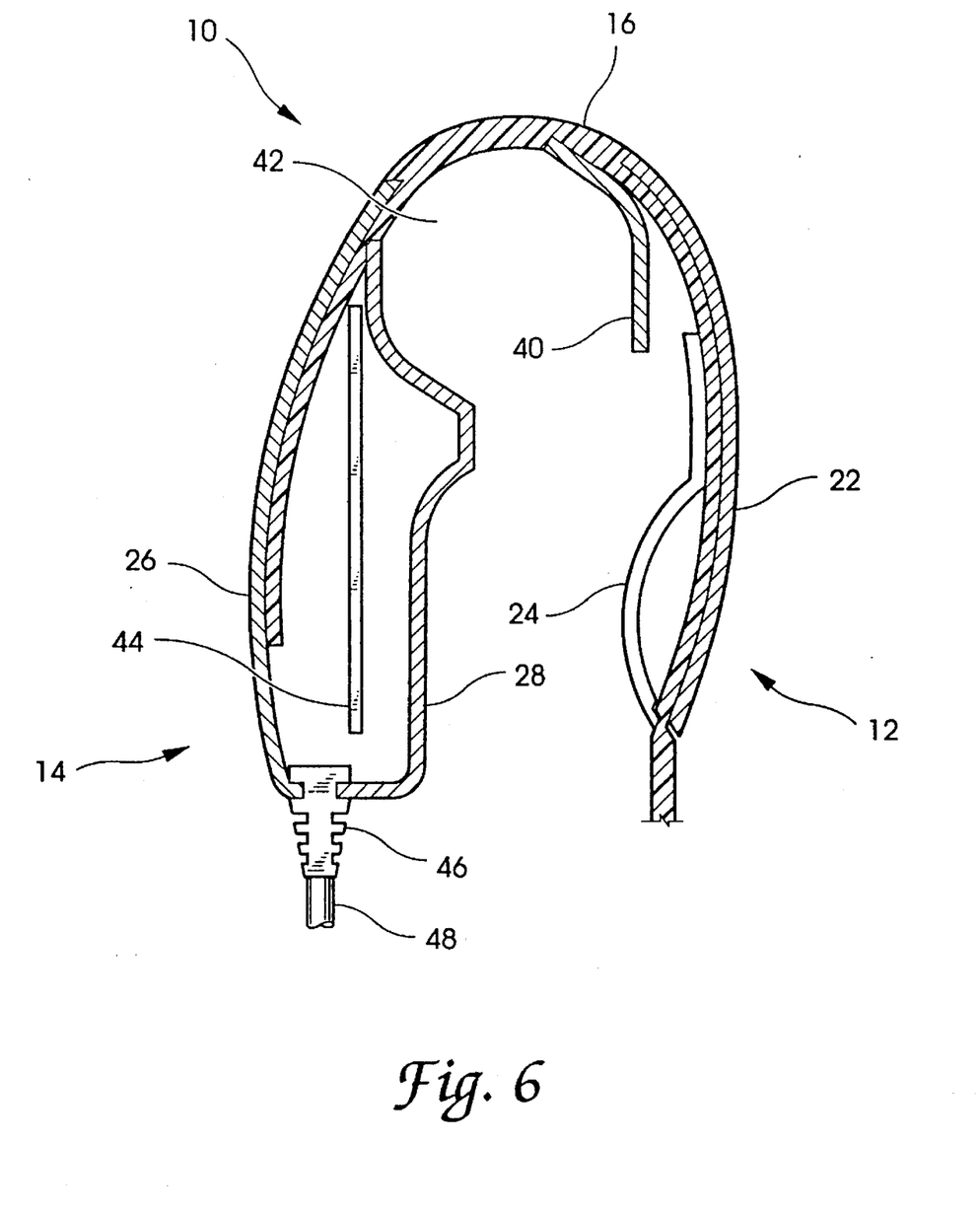
FIG. 6 is a cross-sectional view of the preferred embodiment of the present invention taken along the section line 6—6 of FIG. 4.
Figure 13:
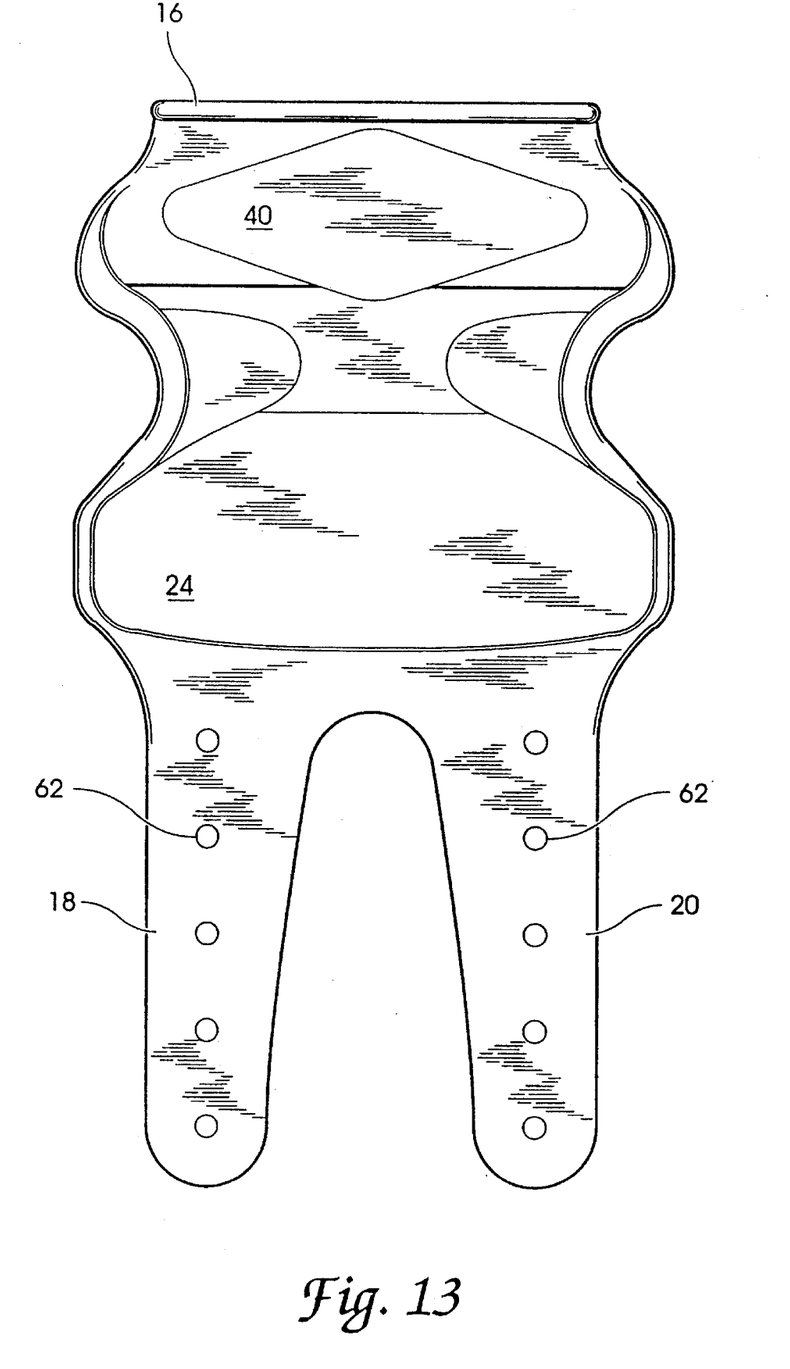
FIG. 13 is an inside elevational view of the front portion of the preferred embodiment of the present invention as view from section line 13—13 of FIG. 12.

Referring to FIGS. 6 and 13, the controller includes a toggle plate 40 mounted to the front portion 12. The toggle plate 40 is preferably made from hard plastic and rests firmly against the handle 32 of the exercise apparatus. The toggle plate 40 pivots about a central axis at approximately 30° from the vertical. Two switches (not shown) are actuated by the toggle plate 40 when it pivots. The switches are activated by being pinched between the toggle plate 40 and the member 22 when pressure is applied to the member 22 by the heel of the user's hand 30. These two switches together form a left/right toggle switch which allows the gross motion of the user's hand 30 to provide input to the video game. For instance, a twist of the user's wrist to the fight will depress the right hand switch, thereby sending a signal from the controller 10 to the video game indicating that a right turn is desired. Similarly, a twist of the user's wrist to the left will depress the left switch, sending a signal to the video game that a left turn is desired. Therefore, left and right commands may be sent to the video game by the controller 10 using the gross motion of the user's hand 30, without requiring fine motor skills. This feature makes the controller 10 natural and intuitive to use, which is especially important during vigorous exercise. It will be appreciated by those skilled in the art that additional switches or sensors may be incorporated into the controller 10 in order to sense other degrees of motion of the user's hand, such as forward and backward motion, for example.

As an alternative to implementing the gross motion sensor of the controller 10 with two separate switches, an alternative embodiment of the present invention uses a rocker switch having left, neutral and tight switch positions. The pivot point of the rocker switch is located substantially near the center line of the controller 10, and will thereby create the necessary signals upon being displaced by the user's hand 30. Those skilled in the art will appreciate that a number of different sensor configurations can be used to sense this twisting motion of the user's hand 30.

Referring once again to FIG. 2, the member 26 of the rear portion 14 is molded with elongated openings 36 and 38 therein. The flexible connector 16 extends behind the openings 36 and 38 and is preferably formed with an increased thickness in this area so that it protrudes through the openings 36 and 38. A first switch (not shown) is mounted within the interior of rear portion 14 behind the opening 36, and a second switch (not shown) is similarly mounted within rear portion 14 behind the opening 38. The openings 36 and 38 are positioned such that when the user's hand 30 is grasping the handlebar 32 over the controller 10, the middle finger and the ring finger of the user's hand 30 will lie over the openings 38 and 36 respectively. The positioning of the first and second switches behind the openings 36 and 38 therefore allows for activation of either of the switches by the user by depressing the flexible coveting 16 which covers the respective openings.

As will be explained in greater detail hereinbelow, the controller 10 includes output means, such as a multiconductor wire, which can be used to transmit the signals from the gross motion sensor as well as the first and second switches behind the openings 36 and 38, to an attached video game while the user is exercising. A video game can be designed to accept these signals as input from the user during play of the game. For example, a video game might be designed specifically for use with a stationary exercise bicycle, wherein the video monitor displays a continuously advancing road scene containing obstacles which the user must avoid. The output from the gross motion sensor may be used to steer the user's position on the road (left or right), while the output from the switches behind openings 36 and 38 may be used to activate other game features, such as firing a weapon. It will be appreciated by those skilled in the art that the gross motion sensor incorporated into the controller 10 allows for intuitive left and right input to the video game during vigorous exercise while the user's hand is grasping the handlebar or handrail of the exercise equipment. Additionally, a fewer or greater number of buttons could be added, depending on the number of things desired to be controlled.

Figure 4:
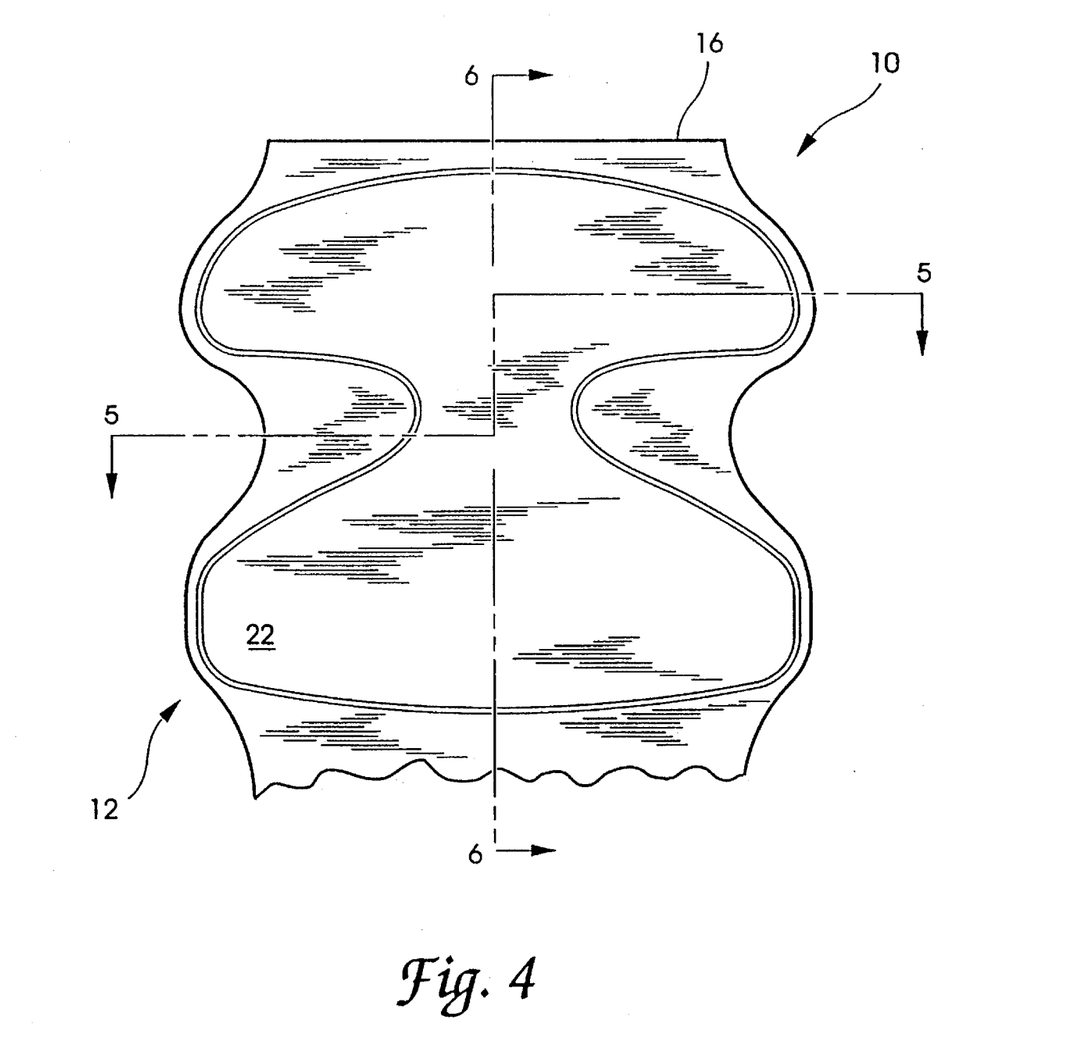
FIG. 4 is a front elevational view of the preferred embodiment of the present invention.
Figure 5:
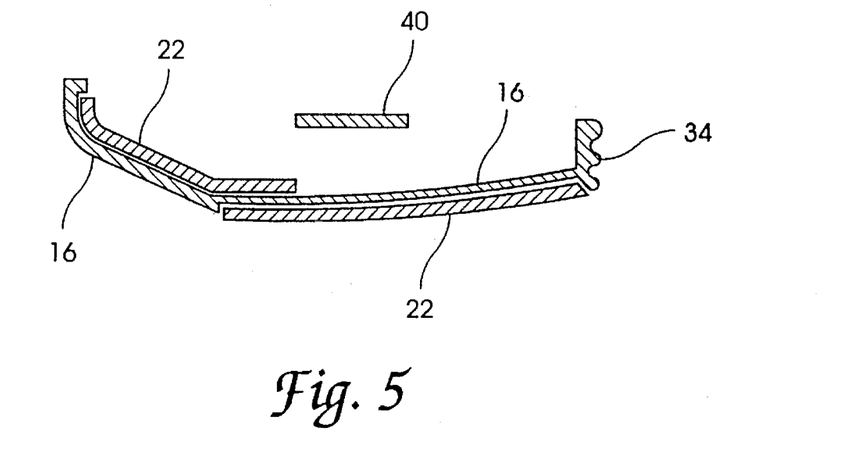
FIG. 5 is a cross-sectional view of the preferred embodiment of the present invention taken along the section line 5—5 of FIG. 4.

Referring now to FIG. 4, there is illustrated an elevational view of the front portion 12 of the controller 10. A horizontal staggered cross-section of the front portion 12 of the controller 10 is illustrated in FIG. 5. The cross-sectional view of FIG. 5 illustrates the positioning of the toggle plate 40 upon which is mounted the switches for sensing the gross motion of the user's hand 30. The toggle plate 40 rests against the handlebar 32 of the exercise equipment, thereby providing a fixed mounting plane for the sensor which is activated by movement of the member 22 with respect thereto.

A vertical cross-section through the controller 10 is illustrated in FIG. 6. It will be appreciated by those skilled in the art that the relative placement of the member 28, the flexible connector 16 and the toggle plate 40 define a substantially cylindrical space 42 for passage of the handlebar 32 of the exercise equipment. Also visible in the view of FIG. 6 is a circuit board 44 which is used to mount the switches which are positioned behind openings 36 and 38, as well as other electronic processing components as described hereinbelow. The circuit board 44 is preferably coupled to the controller 10 by means of bosses (not shown). A strain relief grommet 46 is positioned between the members 26 and 28 in order to allow a multiconductor output wire 48 to pass therethrough. The conductors within the wire 48 (not shown) couple to the circuit board 44 for output of electrical signals from the controller 10. Signals from the toggle plate switches are preferably coupled to the circuit board 44 via wires which ride in u-channels (not shown) formed in the flexible connector 16. Alternatively, these wires can be molded internal to the connector 16.

Figure 7:
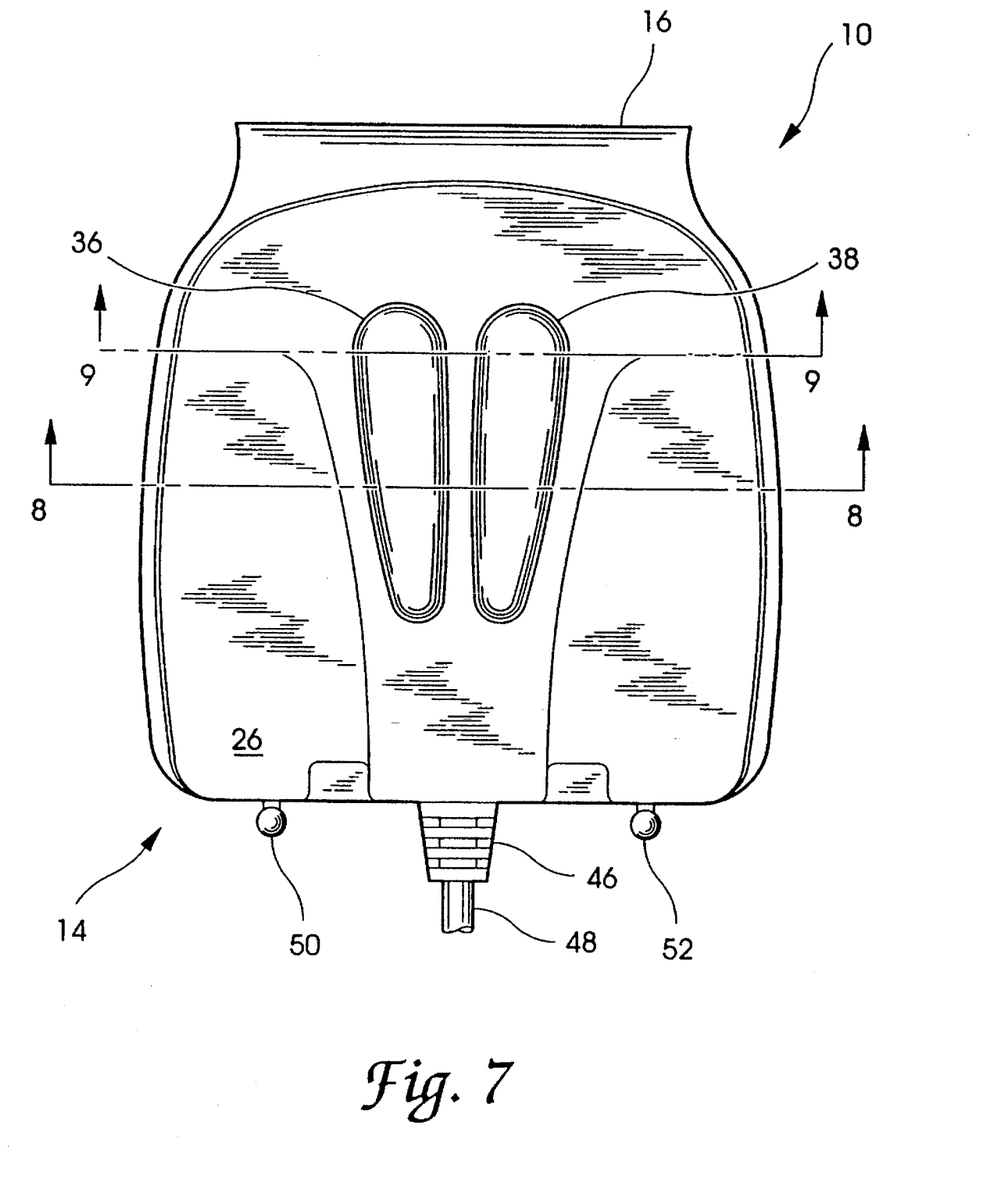
FIG. 7 is a rear elevational view of the preferred embodiment of the present invention.

Referring now to FIG. 7, there is illustrated a plan view of the controller 10 as viewed from the rear. Visible in the view of FIG. 7 are spherical posts 50 and 52 which are molded as part of member 26. The posts 50 and 52 are sized to mate with holes in mounting straps 18 and 20 in order to secure the controller 10 around the handle of the exercise equipment.

Figure 8:
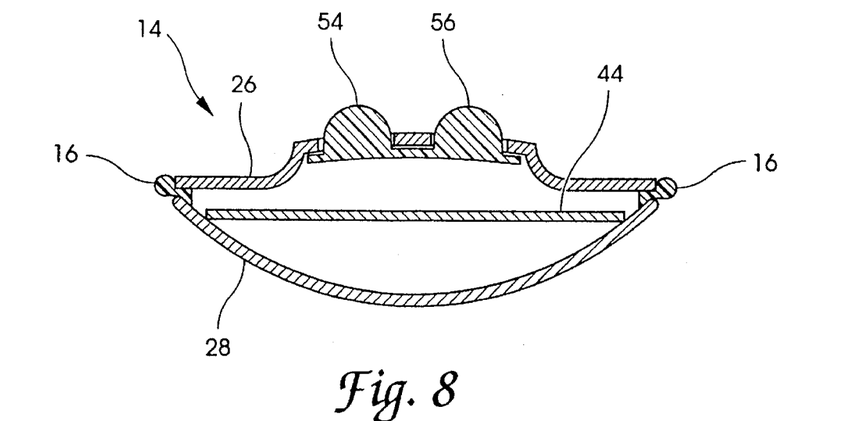
FIG. 8 is a cross-sectional view of the preferred embodiment of the present invention taken along the section line 8—8 of FIG. 7.
Figure 9:
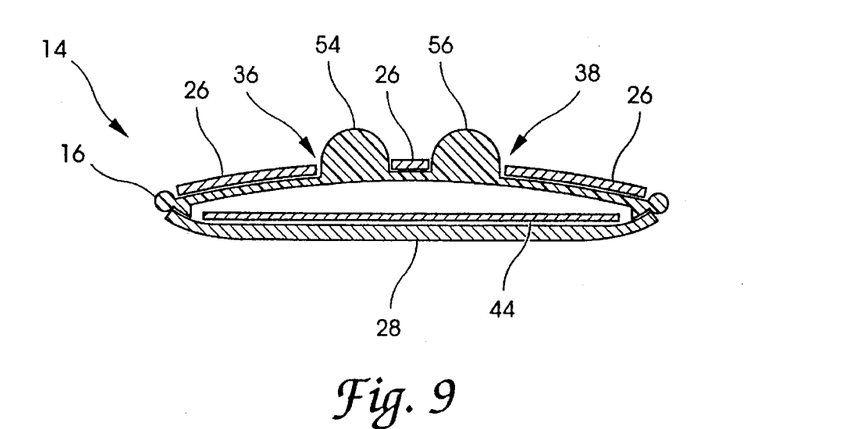
FIG. 9 is a cross-sectional view of the preferred embodiment of the present invention taken along the section line 9—9 of FIG. 7.

Referring now to FIG. 8, there is shown a cross-section taken through the rear portion 14 of the controller 10, as indicated by the section line 8—8 of FIG. 7. A similar cross-section is illustrated in FIG. 9, taken along the section line 9—9 of FIG. 7. It will be appreciated by those skilled in the art that the flexible connector 16 contains areas of increased thickness 54 and 56 which protrude from the upper portions of the switch openings 36 and 38. These thickened portions 54 and 56 gradually decrease in thickness toward the bottom of the openings 36 and 38. Such shape provides a comfortable resting position for the fingers of the user's hand 30, and helps to transmit forces from the fingers to the switches which are mounted on the circuit board 44.

Figure 10:
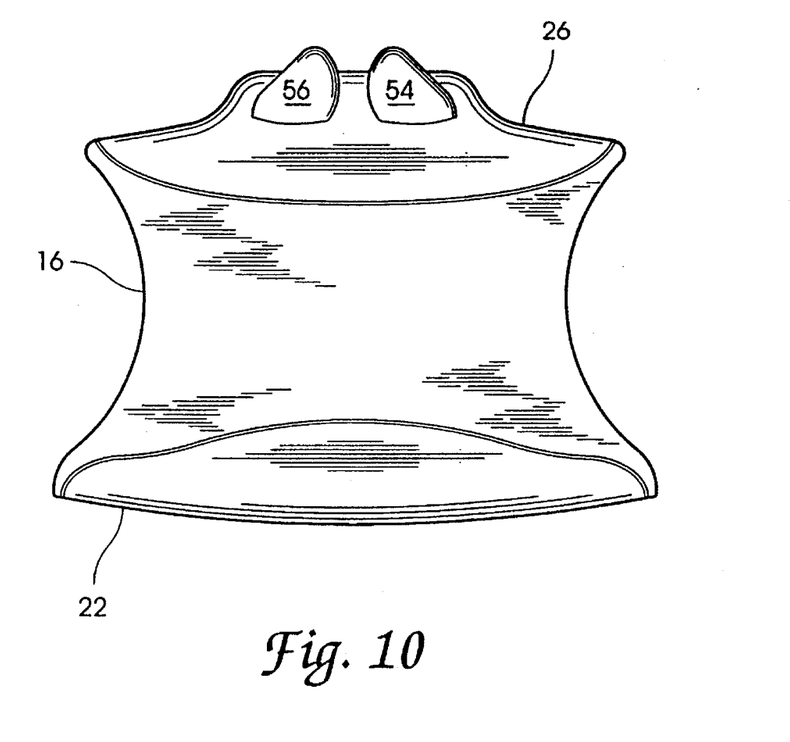
FIG. 10 is a plan view of the preferred embodiment of the present invention.
Figure 11:
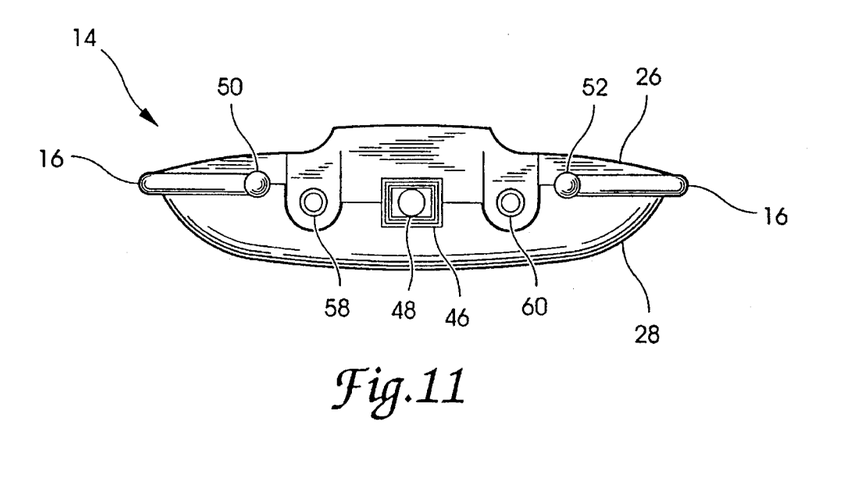
FIG. 11 is a bottom view of the rear portion of the preferred embodiment of the present invention.

Referring now to FIG. 10, there is illustrated a top plan view of the controller 10, looking downward from above the device. The thickened portions 54 and 56 of the flexible connector 16 are clearly visible in this view. Referring now to FIG. 11, a bottom view of the rear portion 14 of the controller 10 is illustrated. Visible in the view of FIG. 11 is a jack 58 which is mounted in an opening of the member 26. The jack 58 is used to input a signal from an external sensor to the controller 10. For example, such a signal may be indicative of a cadence of the exercise being performed on the exercise equipment. For example, the cadence signal could indicate the frequency of pedaling on a stationary bicycle, the frequency of steps taken on a stair climbing machine, or the frequency of steps taken on a treadmill, for example. The signal input through the jack 58 is coupled to the circuit board 44 for further processing before it is output through the multiconductor wire 48 to the video game. Similarly, the member 26 includes an opening for a jack 60 which is also used to input an external sensor signal to controller 10. The signal input through jack 60 may be, for example, a signal indicative of the pulse rate of the user, taken through a sensor clipped to the user's ear, for example. The signal input through the jack 60 is also coupled to the circuit board 44 for further processing before being output through the multiconductor wire 48 to the video game. By accepting inputs from other sensors and relaying these inputs, either with or without intermediate processing, to the video game console via the multiconductor wire 48, the controller 10 of the present invention provides the advantage of transmitting all input signals from several sources to the console with a single wire 48.

Figure 12:
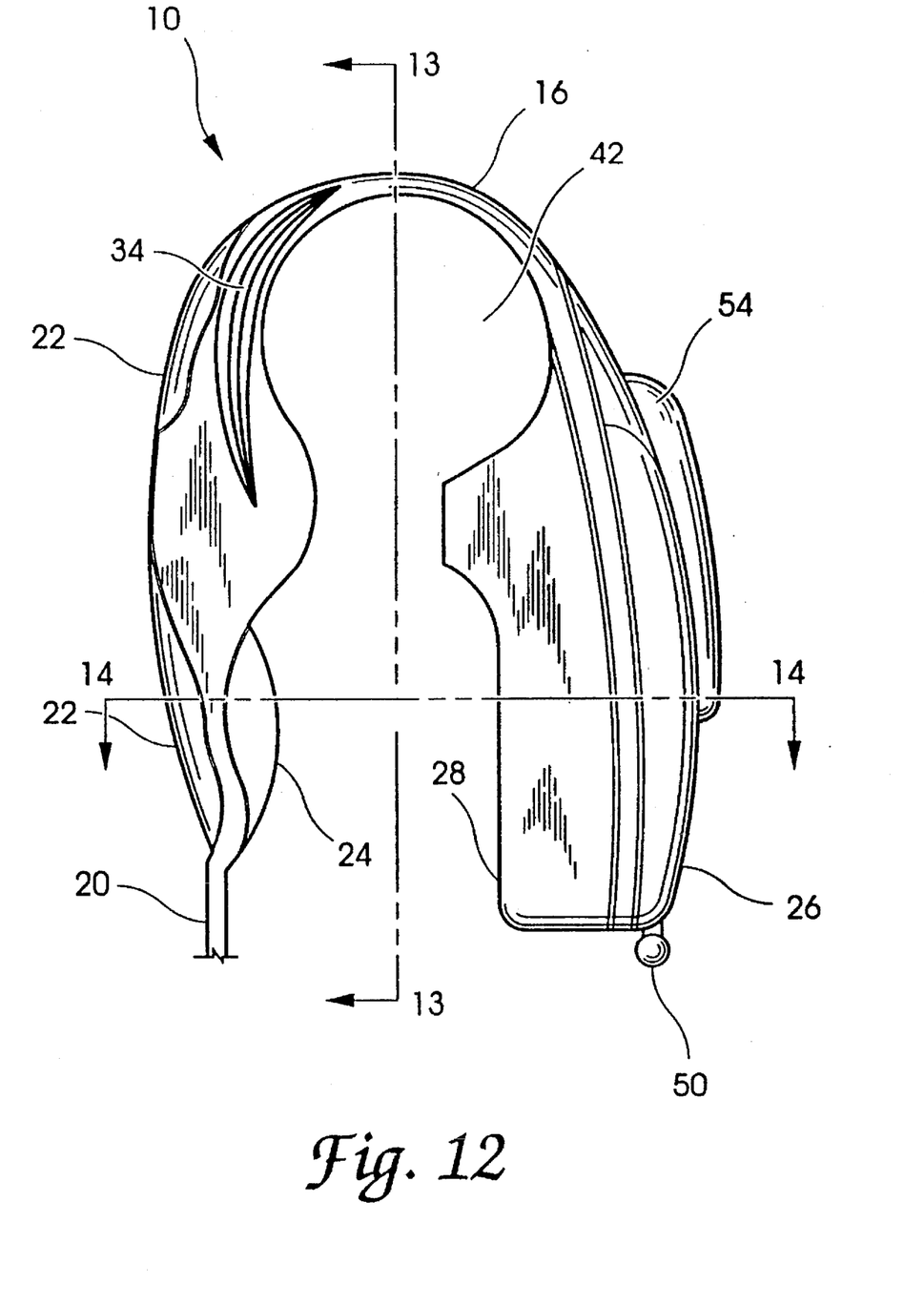
FIG. 12 is a right side elevational view of the preferred embodiment of the present invention.

Referring now to FIG. 12, the controller 10 of the present invention is illustrated in a side elevational view. The extension of the thickened portion 54 of the flexible connector 16 through the member 26 is clearly visible in this view. Also clearly visible are the bellows 34 which facilitate flexure of the member 22 against the toggle plate 40.

Referring now to FIG. 13, there is illustrated a plan view of the inside of the front portion 12, viewed from the section line 13—13 of FIG. 12. The positioning of the toggle plate 40 is clearly visible in this view, as are the straps 18 and 20 used to secure the controller 10 to the handlebar 32. Each of the straps 18 and 20 include a plurahty of holes 62 which mate with the spherical posts 50 and 52 of the member 26.

Figure 14:
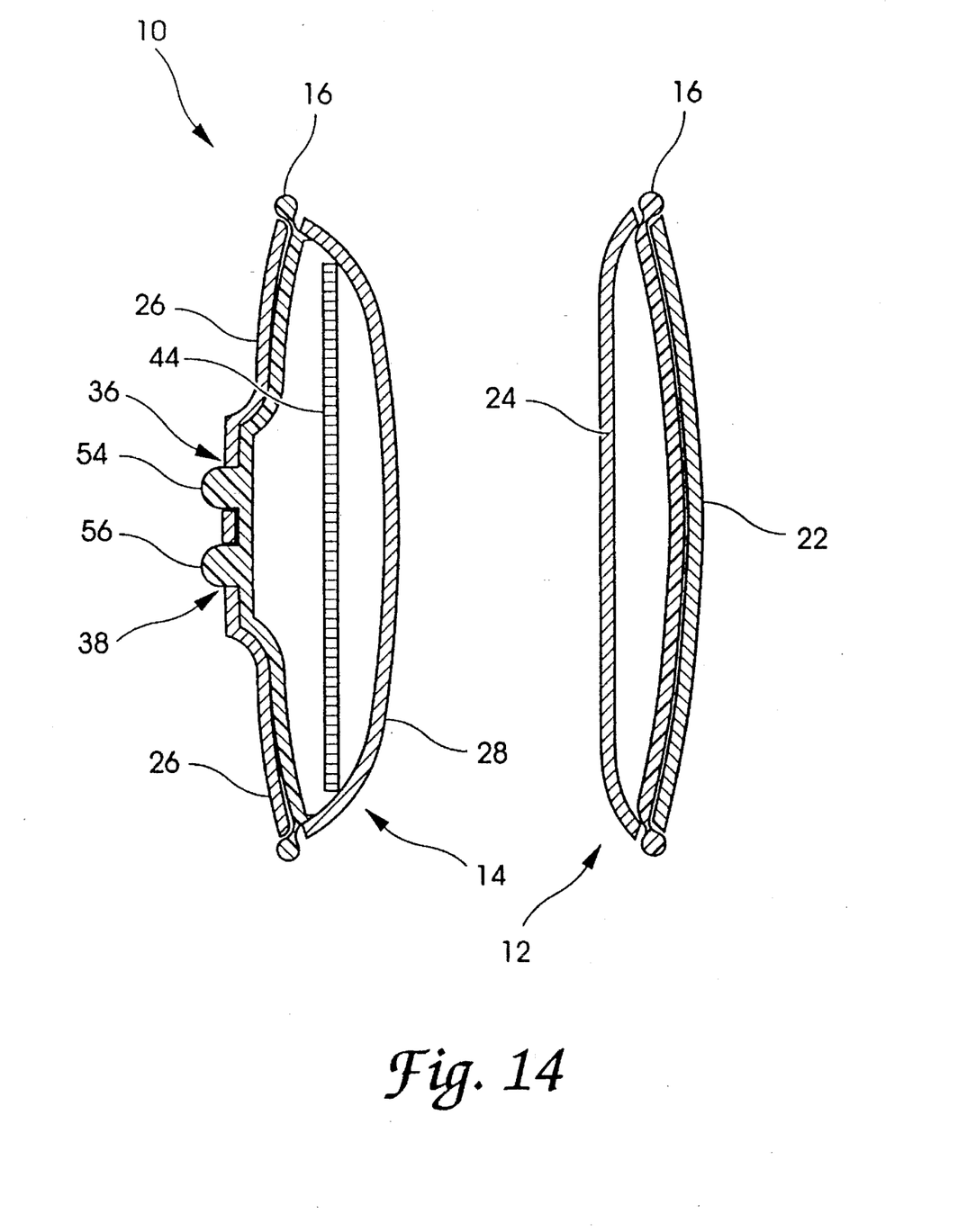
FIG. 14 is a cross-sectional view of the preferred embodiment of the present invention taken along the section line 14—14 of FIG. 12.

Referring now to FIG. 14, there is illustrated a cross-section of the controller 10 taken along the section line 14—14 of FIG. 12. It will be appreciated by those skilled in the art that the thickened portions 54 and 56 of the flexible member 16 are substantially decreased in thickness at the location of the section line 14—14.

Figure 15:
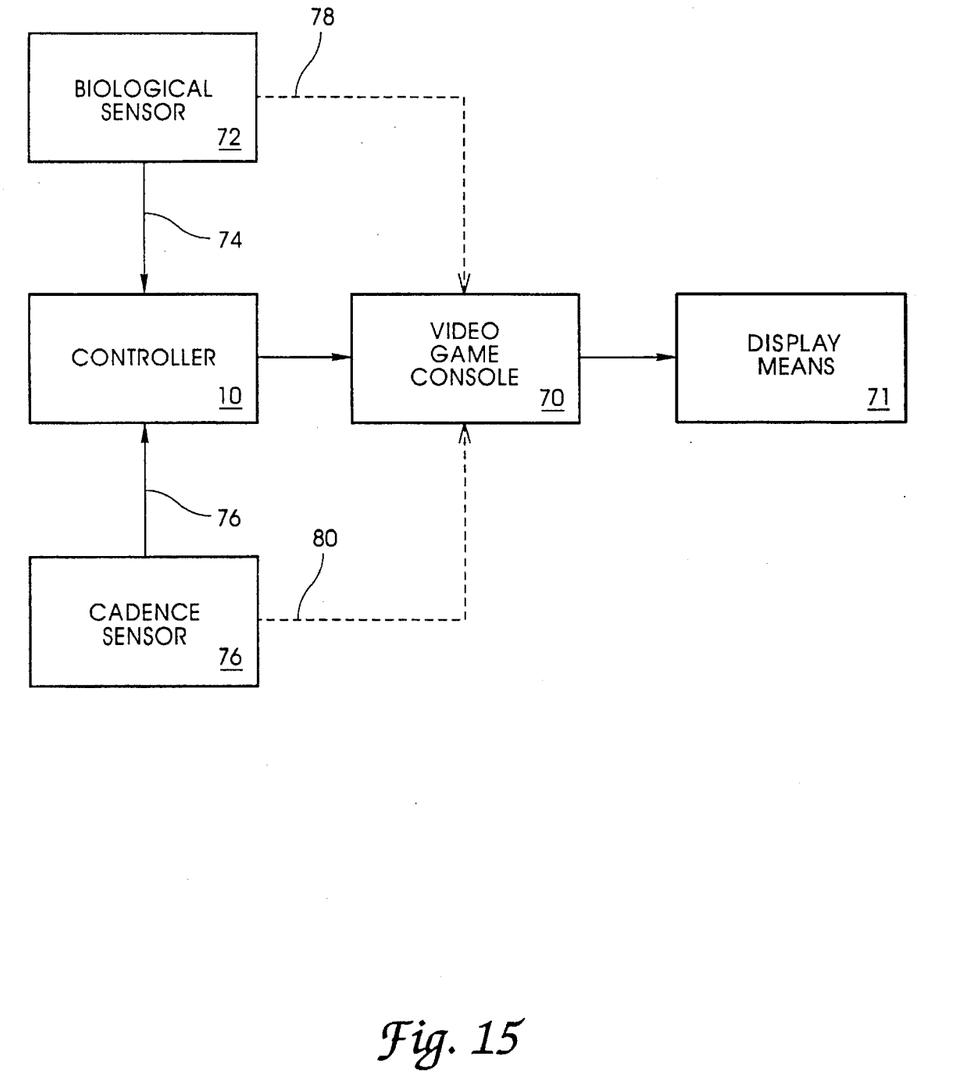
FIG. 15 is a schematic block diagram of a video game system incorporating the controller of the present invention.

Referring now to FIG. 15, there is illustrated a schematic block diagram of a video game system incorporating the controller 10 of the present invention. The video game system includes a video game console 70, such as those manufactured by NINTENDO or SEGA. The video game console 70 is coupled to a display means 71, such as a television receiver, in order to display the video signals produced. by the video game console 70. A biological sensor 72, such as a pulse rate sensor, produces an output signal that is coupled to the controller 10 via the link 74. A cadence sensor 76, which produces a signal which may be indicative, for example, of a cadence of the exercise being performed on the exercise equipment, is also input to the controller 10 via the link 76. The controller 10 then inputs the signals produced by the controller 10 as well as the signals from the biological sensors 72 and the cadence sensor 76 to the video game console 70. Alternatively, the signal produced by the biological sensor 72 may be input directly to the video game console 70 via the link 78, and the signal produced by the cadence sensor 76 may be input directly to the video game console 70 via the link 80.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

For example, the gross motion toggle switch and the first and second finger switches may be formed as integral parts of the handlebar 32 in applications where the invention is not being retrofit or added on to existing exercise equipment. Furthermore, use of the disclosed invention is not limited to input to video games from exercise equipment. Those skilled in the art will immediately recognize from the above disclosure that the invention of the present invention will be equally useful in any application where it is desired to facilitate natural and intuitive control input without the need for fine motor skills. For example, such a controller would be of great benefit as control input to a motorized wheelchair, particularly where the user of the wheelchair suffers from partial or total loss of fine motor skills. Further examples of application of the gross motion sensor of the present invention will be apparent to those skilled in the art after reading the present disclosure. Such further applications of the present invention are intended to be encompassed by the appended claims.

What is claimed is:

1. A video game controller for use with an exercise apparatus, comprising:

a first portion;

a second portion;

a connecting portion coupling said first and second portions;

a gross motion sensor integrated with said first portion; and output means for coupling a signal produced by said gross motion sensor to a video game apparatus;

wherein said first portion, said connecting portion, and said second portion are coupled in a substantially U-shaped configuration in order to facilitate mounting said video game controller over a handle of said exercise apparatus.

2. The video game controller of claim 1, wherein said gross motion sensor is operative to sense rotation of a user's wrist.

3. The video game controller of claim 1 wherein said gross motion sensor comprises:

a first switch; and a second switch spaced from said first switch;

wherein rotation of a user's wrist in a first direction activates said first switch and rotation of said user's wrist in a second direction activates said second switch.

4. The video game controller of claim 1, further comprising a switch integrated with said second portion, wherein said switch is operable by at least one finger of a user's hand and wherein said output means is further operable to couple n second signal produced by said, switch to said video game apparatus.

5. The video game controller of claim 1, further comprising:

a first input for receiving a cadence signal representative of a cadence of an exercise being performed by a user on said exercise apparatus; and a second input for receiving a pulse signal representative of said user's heart rate;

wherein said output means is further operable to couple said cadence signal and said pulse signal to said video game apparatus.

6. The video game controller of claim 1, wherein said first portion, said second portion and said connecting portion are integrally formed.

7. An exercise apparatus including a video game controller, comprising:

a handle adapted to be gripped by a user's hand while performing an exercise on said exercise apparatus;

a gross motion sensor coupled to said handle; and output means for coupling a signal produced by said gross motion sensor to a video game apparatus:

wherein said signal produced by said gross motion sensor is indicative of pressure applied to different points on said handle in response to flexure of said user's wrist.

8. The exercise apparatus of claim 7, wherein said gross motion sensor comprises:

a first switch; and a second switch spaced from said first switch;

wherein rotation of a user's wrist in a first direction activates said first switch and rotation of said user's wrist in a second direction activates said second switch.

9. The exercise apparatus of claim 7, further comprising a switch coupled to the handle, wherein said switch is operable by at least one finger of a user's hand and wherein said output means is further operable to couple a second signal produced by said switch to said video game apparatus.

10. The exercise apparatus of claim 7, further comprising:

a first input for receiving a cadence signal representative of a cadence of an exercise being performed by a user on said exercise apparatus; and a second input for receiving a pulse signal representative of said user's heart rate:

wherein said out, put means is further operable to couple said cadence signal and said pulse signal to said video game apparatus.

11. A video game controller for use with an exercise apparatus, comprising:

means for securing said video game controller to a handle of said exercise apparatus such that said video game controller may be gripped by a hand of a user of said exercise apparatus;

a gross motion sensor integral with said video game controller; and output means for coupling a signal produced by said gross motion sensor to a video game apparatus;

wherein said signal produced by said gross motion sensor is indicative of pressure applied to different points on said video game controller in response to flexure of said user's wrist.

12. The video game controller of claim 11, wherein said gross motion sensor comprises:

a first switch: and a second switch spaced from said first switch;

wherein rotation of a user's wrist in a first direction activates said first switch and rotation of said user's wrist in a second direction activates said second switch.

13. The video game controller of claim 11, further comprising a switch integral with said video game controller, wherein said switch is operable by at least one finger of a user's hand and wherein said output means is further operable to couple a second signal produced by said switch to said video game apparatus.

14. The video game controller of claim 11, further comprising:

a first input for receiving a cadence signal representative of a cadence of an exercise being performed by a user on said exercise apparatus; and a second input for receiving a pulse signal representative of said user's heart rate;

wherein said output means is further operable to couple said cadence signal and said pulse signal to said video game apparatus.

15. The video game controller of claim 11, wherein said means for securing comprises:

a first portion in which said gross motion sensor is integrated;

a second portion;

a connecting portion coupling said first and second portions;

wherein said first portion, said connecting portion, and said second portion are coupled in a substantially U-shaped configuration in order to facilitate mounting said video game controller over a handle of said exercise apparatus.

* * * * *

UNITED STATES PATENT AND TRADEMARK OFFICE
CERTIFICATE OF CORRECTION

PATENT NO. : 5,568,928

DATED : October 29, 1996

INVENTOR(S) : Bruce N. Munson and Steven C. Visser

It is certified that error appears in the above-identified patent and that said Letters Patent is hereby corrected as shown below:

In column 1, line 57, after "stationary", please insert --bicycle are moved. This means that the manufacturer must design a different--.

In column 3, line 36, please change "thee" to --the--.

In column 4, line 53, please change "fight" to --right--.

In column 5, line 4, please change "tight" to --right--.

In column 7, line 9, please change "plurahty" to --plurality--.

In column 8, line 29, please change "n" to --a--.

In column 8, line 29, please change "said," to --said--.

Signed and Sealed this

Twenty-eighth Day of January, 1997

Attest:

BRUCE LEHMAN

Attesting Officer    Commissioner of Patents and Trademarks